US006986570B2

(12) United States Patent
Jones et al.

(10) Patent No.: US 6,986,570 B2

(45) **Date of Patent: *Jan. 17, 2006**

(54) FEED GUIDANCE AND IDENTIFICATION FOR INK STICK

(75) Inventors: Brent R. Jones, Tualatin, OR (US); Frederick T. Mattern, Portland, OR (US); Barry D. Reeves, Lake Oswego, OR (US); Timothy L. Crawford, Saint Paul, OR (US); James D. Rise, Lake Oswego, OR (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/811,197

(22) Filed: Mar. 26, 2004

(65) Prior Publication Data

US 2004/0179074 A1 Sep. 16, 2004

Related U.S. Application Data

(62) Division of application No. 10/135,156, filed on Apr. 29, 2002, now Pat. No. 6,722,764.

(51) Int. Cl.
*B41J 2/175* (2006.01)
*G01D 11/00* (2006.01)

(52) U.S. Cl. .......................................... 347/88; 347/99

(58) Field of Classification Search .................. 347/88, 347/99, 84, 85, 95
See application file for complete search history.

(56) References Cited

U.S. PATENT DOCUMENTS

| | | | | |
|---|---|---|---|---|
| 5,442,387 A | | 8/1995 | Loofbourow et al. | 347/88 |
| 5,455,604 A | | 10/1995 | Adams et al. | 346/138 |
| 5,734,402 A | | 3/1998 | Rousseau et al. | 347/88 |
| 5,805,191 A | | 9/1998 | Jones et al. | 347/103 |
| 5,861,903 A | | 1/1999 | Crawford et al. | 347/88 |
| 5,917,528 A | | 6/1999 | Grellmann et al. | 347/88 |
| 6,053,608 A | * | 4/2000 | Ishii et al. | 347/88 |
| 6,672,716 B2 | | 1/2004 | Jones | 347/88 |
| 2003/0202056 A1 | | 10/2003 | Jones et al. | 347/85 |
| 2003/0202064 A1 | | 10/2003 | Jones et al. | 347/88 |
| 2003/0202066 A1 | | 10/2003 | Jones et al. | 347/88 |
| 2003/0202067 A1 | | 10/2003 | Jones et al. | 347/88 |
| 2003/0202068 A1 | | 10/2003 | Jones et al. | 347/88 |
| 2003/0202069 A1 | | 10/2003 | Jones et al. | 347/88 |

(Continued)

OTHER PUBLICATIONS

Merriam Webster's Collegiate Dictionary Tenth Edition; nest; p. 778.*

(Continued)

*Primary Examiner*—Manish Shah
*Assistant Examiner*—Leonard Liang
(74) *Attorney, Agent, or Firm*—David J. Arthur

(57) ABSTRACT

An ink stick for a solid ink feed system of a phase change ink printer includes an ink stick body having an insertion perimeter, and a guide surface with a shaped guide element shaped to interact with an elongate shaped guide rail of the solid ink feed system. The ink stick insertion perimeter is in a plane substantially perpendicular to the insertion direction, and the insertion direction and the feed direction are different. The insertion perimeter has at least one perimeter section forming a nonlinear key element that matches in size and shape a nonlinear key element in the perimeter of the key plate insertion opening. In particular implementations, the insertion perimeter forms a visually recognizable symbol, such as an alphanumeric character. In particular implementations, a plurality of ink sticks form a set in which the visually recognizable symbols differ from one another, and may form a pattern of symbols, such as a sequence of alphanumeric characters.

22 Claims, 7 Drawing Sheets

U.S. PATENT DOCUMENTS

| | | | | |
|---|---|---|---|---|
| 2003/0202074 A1 | 10/2003 | Jones et al. | .................... | 347/99 |
| 2003/0202075 A1 | 10/2003 | Jones | .......................... | 347/99 |
| 2003/0202076 A1 | 10/2003 | Jones et al. | .................... | 347/99 |
| 2003/0202077 A1 | 10/2003 | Jones et al. | .................... | 347/88 |
| 2003/0202078 A1 | 10/2003 | Jones et al. | .................... | 347/99 |

OTHER PUBLICATIONS

Jones et al., "Guide for Solid Ink Stick Feed," U.S. Appl. No. 10/135,051, filed concurrently herewith.

Jones et al., "Guide For Solid Ink Stick Feed," U.S. Appl. No. 10/135,078, filed concurrently herewith.

Jones et al., "Alignment Feature for Solid Ink Stick," U.S. Appl. No. 10/135,089, filed concurrently herewith.

Jones et al., "Solid Ink Stick With Efficient Aspect Ratio," U.S. Appl. No. 10/135,050, filed concurrently herewith.

Jones, "Guide for Solid Ink Stick Feed," U.S. Appl. No. 10/135,077, filed concurrently herewith.

Jones, "Solid Ink Stick Set Identification," U.S. Appl. No. 10/135,024, filed concurrently herewith.

Jones et al., "Channel Keying for Solid Ink Stick Feed," U.S. Appl. No. 10/135,038, filed concurrently herewith.

Jones et al., "Solid Ink Stick with Identifiable Shape," U.S. Appl. No. 10/135,034, filed concurrently herewith.

Jones, "Multiple Portion Solid Ink Stick," U.S. Appl. No. 10/135,105, filed concurrently herewith.

Jones et al., "Visible Identification of Solid Ink Stick," U.S. Appl. No. 10/135,067, filed concurrently herewith.

Jones et al., "Multiple Segment Keying for Solid Ink Stick Feed," U.S. Appl. No. 10/135,085, filed concurrently herewith.

Jones et al., "Channel Keying for Solid Ink Insertion," U.S. Appl. No. 10/135,065, filed concurrently herewith.

Summary of Tektronix/Xerox Corporation Solid Ink Stick Products sold at least one year prior to Apr. 29, 2002.

* cited by examiner

FEED GUIDANCE AND IDENTIFICATION FOR INK STICK

This application is a divisional application of U.S. application Ser. No. 10/135,156, filed Apr. 29, 2002 now U.S. Pat. No. 6,722,764 by Brent R. Jones et al., and entitled "Feed Guidance and Identification for Ink Stick," the contents of which are hereby incorporated herein by reference.

CROSS-REFERENCE TO RELATED APPLICATIONS

Reference is made to commonly-assigned copending U.S. patent application Ser. No. 10/135,051, now U.S. Publication No. 20030202067A1, filed Apr. 29, 2002, entitled "Guide For Solid Ink Stick Feed," by Jones et al., U.S. patent application Ser. No. 10/135,078, now U.S. Publication No. 20030202077A1, filed Apr. 29, 2002, entitled "Guide For Solid Ink Stick Feed," by Jones et al., U.S. patent application Ser. No. 10/135,089, now U.S. Publication No. 20030202078A1, filed Apr. 29, 2002, entitled "Alignment Feature for Solid Ink Stick," by Jones et al., U.S. patent application Ser. No. 10/135,050, now U.S. Publication No. 20030202066A1, filed Apr. 29, 2002, entitled "Solid Ink Stick With Efficient Aspect Ratio," by Jones et al., U.S. patent application Ser. No. 10/135,077, now U.S. Publication No. 20030202069A1, filed Apr. 29, 2002, entitled "Guide For Solid Ink Stick Feed," by Jones, U.S. patent application Ser. No. 10/135,024, now U.S. Publication No. 20030202074A1, filed Apr. 29, 2002, entitled "Solid Ink Stick Set Identification," by Jones, U.S. patent application Ser. No. 10/135,038, now U.S. Publication No. 20030202064A1, filed Apr. 29, 2002, entitled "Channel Keying for Solid Ink Stick Feed," by Jones et al., U.S. patent application Ser. No. 10/135,034, now U.S. Publication No. 20030202075A1, filed Apr. 29, 2002, entitled "Solid Ink Stick with Identifiable Shape," by Jones, U.S. patent application Ser. No. 10/135,105, now U.S. Pat. No. 6,672,716, filed Apr. 29, 2002, entitled "Multiple Portion Solid Ink Stick," by Jones, U.S. patent application Ser. No. 10/135,067, now U.S. Publication No. 20030202076A1, filed Apr. 29, 2002, entitled "Visible Identification of Solid Ink Stick," by Jones et al., U.S. patent application Ser. No. 10/135,085, now U.S. Publication No. 20030202056A1, filed Apr. 29, 2002, entitled "Multiple Segment Keying for Solid Ink Stick Feed," by Jones et al., and U.S. patent application Ser. No. 10/135,065, now U.S. Publication No. 20030202068A1, filed Apr. 29, 2002, entitled "Channel Keying for Solid Ink Insertion," by Jones et al., the disclosure(s) of which are incorporated herein."

The present invention relates generally to ink printers, the ink used in such ink printers, and the apparatus and method for feeding the ink into the printer.

BACKGROUND

Solid ink or phase change ink printers conventionally receive ink in a solid form and convert the ink to a liquid form for jetting onto a receiving medium. The printer receives the solid ink either as pellets or as ink sticks in a feed channel. With solid ink sticks, the solid ink sticks are either gravity fed or spring loaded through the feed channel toward a heater plate. The heater plate melts the solid ink into its liquid form. In a printer that receives solid ink sticks, the sticks are either gravity fed or spring loaded into a feed channel and pressed against a heater plate to melt the solid ink into its liquid form. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

SUMMARY

An ink stick for use in a solid ink feed system of a phase change ink printer includes a three dimensional ink stick body having a guide surface and an insertion perimeter, and a shaped guide element formed in the guide surface shaped to interact with an elongate shaped guide rail of the solid ink feed system for guiding the ink stick along the guide rail. The ink stick insertion perimeter is in a plane substantially perpendicular to the insertion direction, and the insertion direction is substantially different from the feed direction. The insertion perimeter has at least one perimeter section forming a nonlinear key element that matches in size and shape a nonlinear key element in the perimeter of the key plate insertion opening. In particular implementations, the insertion perimeter forms a visually recognizable symbol, and the at least one perimeter section forms a portion of the visually recognizable symbol, such as a portion of an alphanumeric character.

An ink stick for use in a solid ink feed system of a phase change ink printer includes a three dimensional ink stick body having a guide surface and an insertion perimeter, and a shaped guide element formed in the guide surface shaped to interact with the elongate shaped guide rail of the solid ink feed system for guiding the ink stick along the guide rail. The ink stick insertion perimeter is in a plane substantially perpendicular to the insertion direction, the insertion direction is substantially different from the feed direction, and at least a portion of the insertion perimeter is shaped to form a visually recognizable symbol.

A set of ink sticks for use in a solid ink feed system of a phase change ink jet printer includes a first ink stick comprising a first three dimensional ink stick body and a second ink stick comprising a second three dimensional ink stick body. The first ink stick body has a first shaped guide element oriented in a first feed direction, and the second ink stick body has a second shaped guide element oriented in a second feed direction. The first shaped guide element is shaped to interact with the elongate shaped guide rail of a corresponding first ink stick feed channel for guiding the ink stick in the first feed direction along the first guide rail. The second shaped guide element is shaped to interact with the elongate guide rail of a corresponding second ink stick feed channel for guiding the ink stick in the second feed direction along the second guide rail. The first ink stick body has a first insertion perimeter forming the shape of a first visually identifiable symbol, and the second ink stick body has a second insertion perimeter forming the shape of a second visually identifiable symbol. The first insertion perimeter is oriented in a different direction than the first feed direction, and the second insertion perimeter is oriented in a different direction than the second feed direction. The second visually identifiable symbol is different from the first visually identifiable symbol. In particular implementations the first and second visually identifiable symbols form a pattern of symbols, such as a sequence of consecutive alphanumeric symbols.

A method of inserting an ink stick into an ink feed system includes Identifying an ink stick perimeter shape, and matching the ink stick perimeter shape with a correspondingly shaped key plate opening of the ink feed system. The method further includes inserting the ink stick in an insertion direction through the key plate opening, engaging a shaped ink stick guide element on the ink stick with a shaped guide rail in the ink feed system having a shape corresponding to the shape of the shaped ink stick guide element, and moving the ink stick in a feed direction so that the shaped ink stick guide element engaged with the shaped guide rail guides the shaped ink stick guide element along the shaped guide rail. The feed direction is different from the insertion direction.

THE DRAWINGS

DETAILED DESCRIPTION

Figure 1:
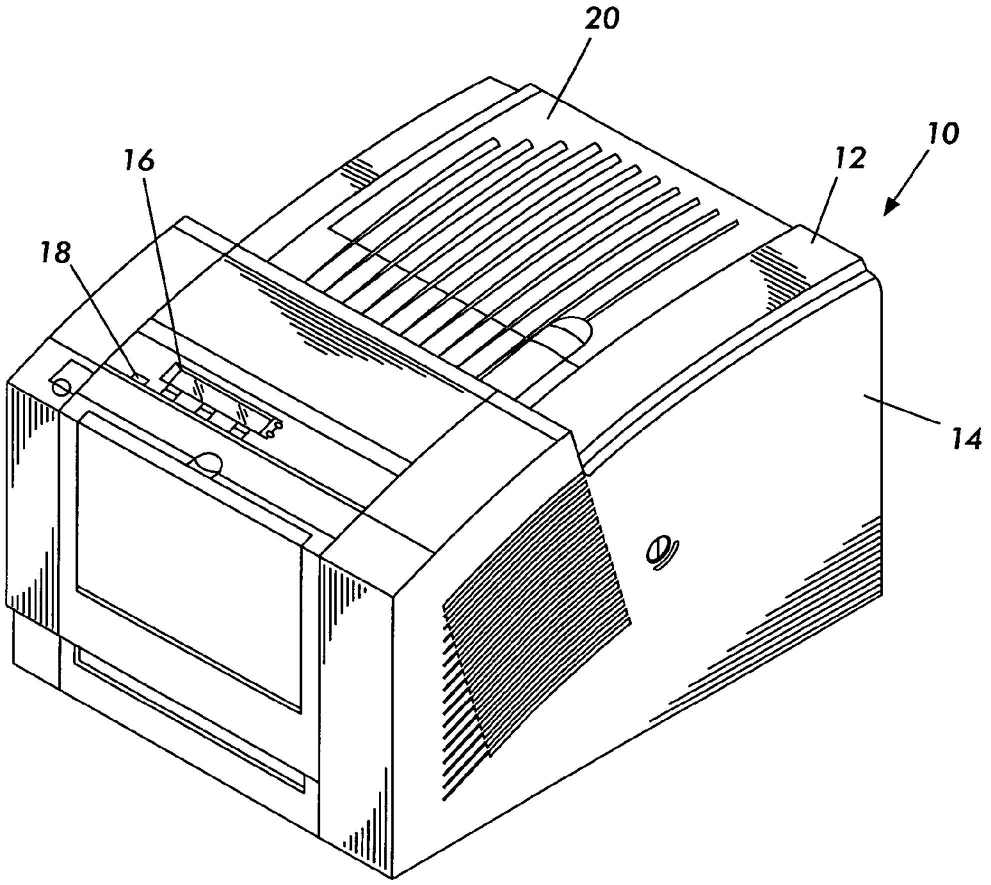
FIG. 1 is a perspective view of a phase change printer with the printer top cover closed.
Figure 2:
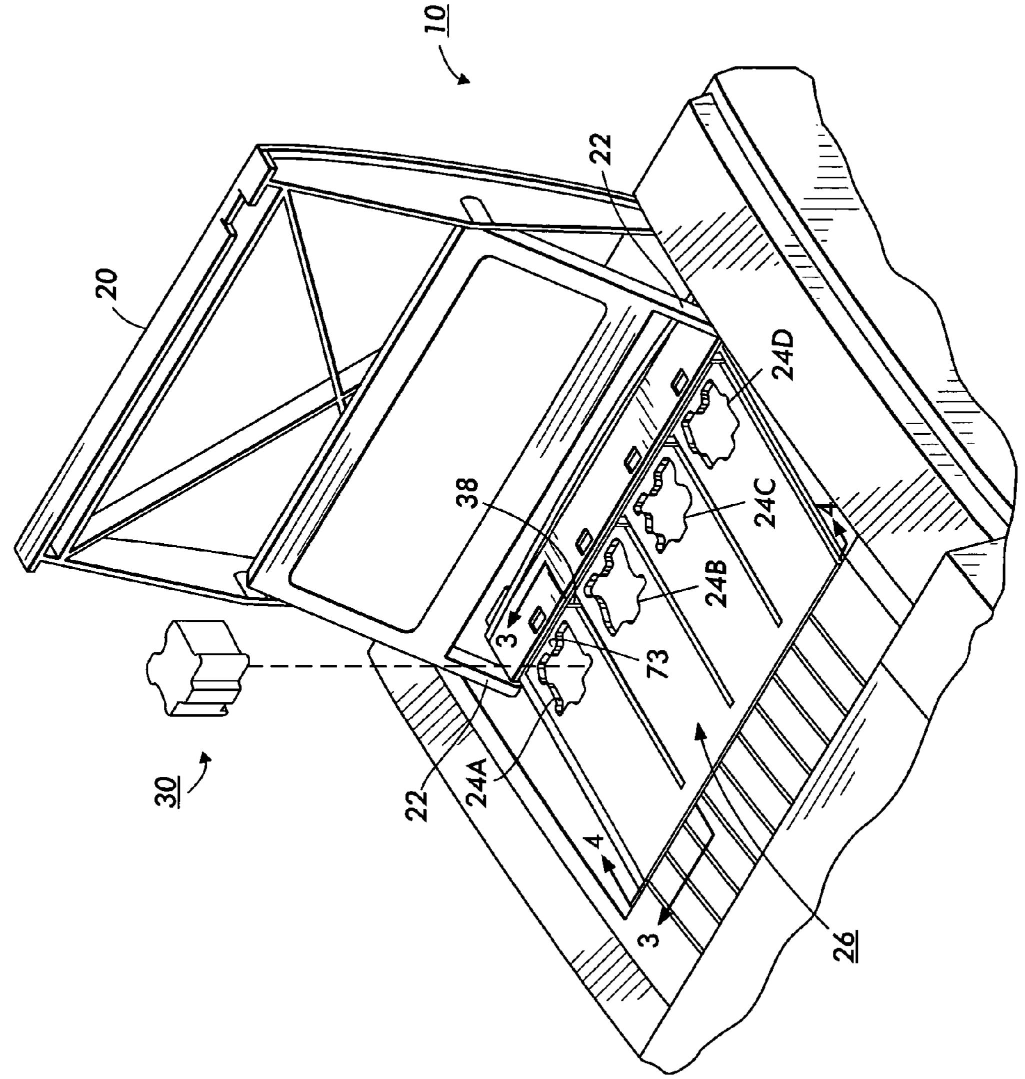
FIG. 2 is an enlarged partial top perspective view of the phase change printer with the ink access cover open, showing a solid ink stick in position to be loaded into a feed channel.

FIG. 1 shows a solid ink, or phase change, ink printer 10 that includes an outer housing having a top surface 12 and side surfaces 14. A user interface, such as a front panel display screen 16, displays information concerning the status of the printer, and user instructions. Buttons 18 or other control elements for controlling operation of the printer are adjacent the front panel display screen, or may be at other locations on the printer. An ink jet printing mechanism (not shown) is contained inside the housing. Such a printing mechanism is described in U.S. Pat. No. 5,805,191, entitled Surface Application System, to Jones et al., and U.S. Pat. No. 5,455,604, entitled Ink Jet Printer Architecture and Method, to Adams et al. An ink feed system delivers ink to the printing mechanism. The ink feed system is contained under the top surface of the printer housing. The top surface of the housing includes a hinged ink access cover 20 that opens as shown in FIG. 2, to provide the operator access to the ink feed system.

Figure 3:
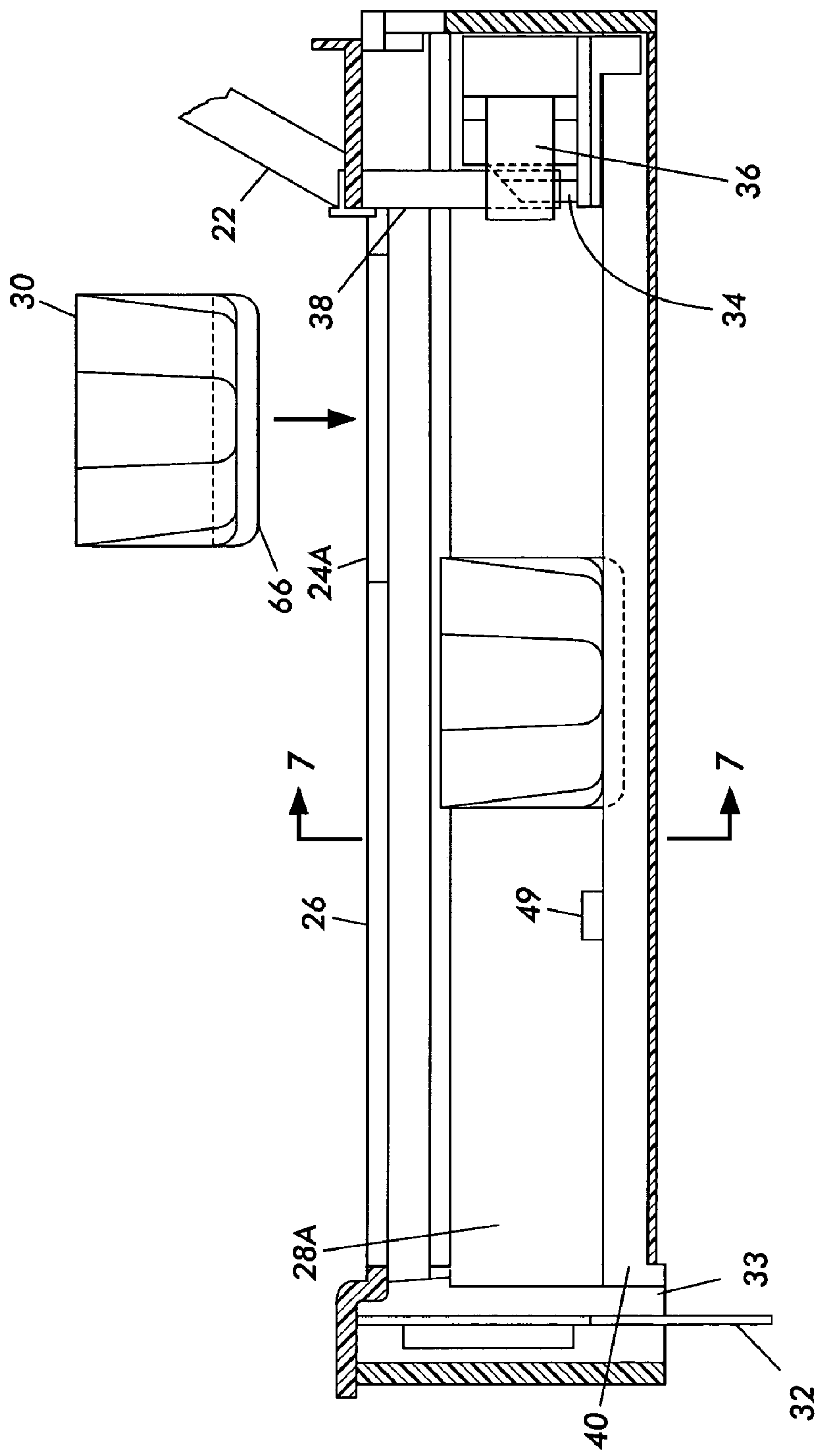
FIG. 3 is a side sectional view of a feed channel of the solid ink feed system, taken along line 3—3 of FIG. 2.

In the particular printer shown, the ink access cover 20 is attached to an ink load linkage element 22 so that when the printer ink access cover 20 is raised, the ink load linkage 22 slides and pivots to an ink load position. The interaction of the ink access cover and the ink load linkage element is described in U.S. Pat. No. 5,861,903 for an Ink Feed System, issued Jan. 19, 1999 to Crawford et al., though with some differences noted below. As seen in FIG. 2, opening the ink access cover reveals a key plate 26 having keyed openings 24A, 24B, 24C, 24D. Each keyed opening 24A, 24B, 24C, 24D provides access to an insertion end of one of several individual feed channels 28A, 28B, 28C, 28D of the solid ink feed system (see FIGS. 2 and 3).

Figure 4:
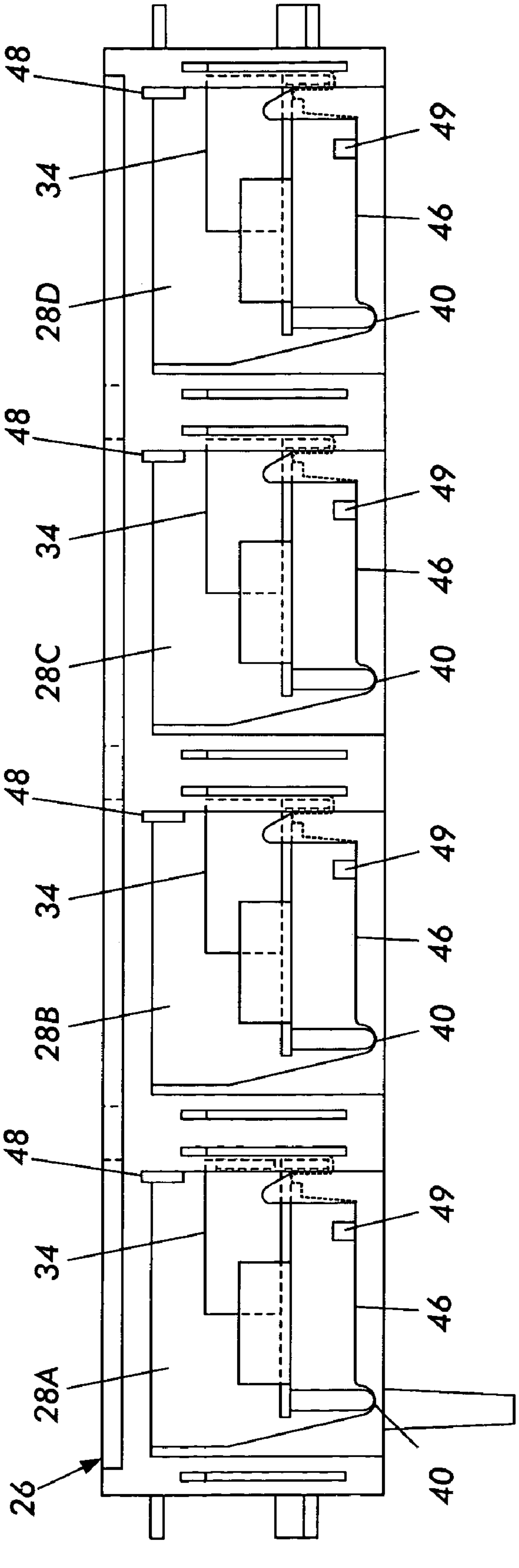
FIG. 4 is a sectional view of the ink stick feed system, taken along line 4—4 of FIG. 2.

Each longitudinal feed channel 28 delivers ink sticks 30 of one particular color to a corresponding melt plate 32. Each feed channel has a longitudinal feed direction from the insertion end of the feed channel to the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown). The feed channels 28 have a longitudinal dimension from the insertion end to the melt end, and a lateral dimension, substantially perpendicular to the longitudinal dimension. Each feed channel in the particular embodiment illustrated includes a push block 34 driven by a driving force or element, such as a constant force spring 36, to push the individual ink sticks along the length of the longitudinal feed channel toward the melt plates 32 that are at the melt end of each feed channel. The tension of the constant force spring 36 drives the push block toward the melt end of the feed channel. In a manner similar to that described in U.S. Pat. No. 5,861,903, the ink load linkage 22 is coupled to a yoke 38, which is attached to the constant force spring 36 mounted in the push block 34. The attachment to the ink load linkage 22 pulls the push block 34 toward the insertion end of the feed channel when the ink access cover is raised to reveal the key plate 26. The constant force spring 36 can be a flat spring with its face oriented along a substantially vertical axis. FIG. 4 is a cross-sectional view of an exemplary feed chute comprising a set of feed channels 28. FIG. 4 is a cross-sectional view of an exemplary feed chute comprising a set of feed channels 28.

A color printer typically uses four colors of ink (yellow, cyan, magenta, and black). Ink sticks 30 of each color are delivered through a corresponding individual one of the feed channels 28. The operator of the printer exercises care to avoid inserting ink sticks of one color into a feed channel for a different color. Ink sticks may be so saturated with color dye that it may be difficult for a printer operator to tell by the apparent color alone of the ink sticks which color is which. Cyan, magenta, and black ink sticks in particular can be difficult to distinguish visually based on color appearance. The key plate 26 has keyed openings 24A, 24B, 24C, 24D to aid the printer operator in ensuring that only ink sticks of the proper color are inserted into each feed channel. Each keyed opening 24A, 24B, 24C, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel.

Figure 5:
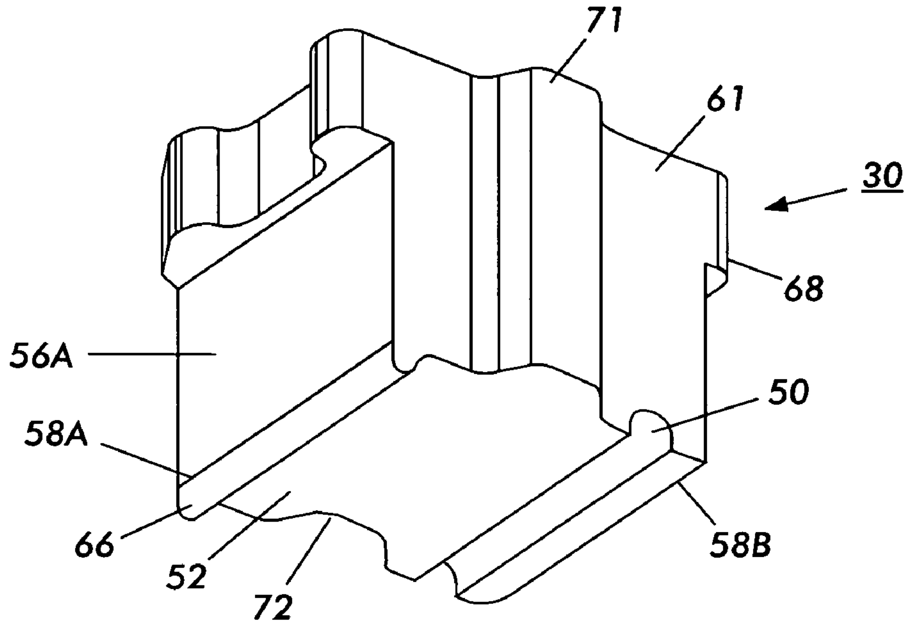
FIG. 5 is a perspective view of an embodiment of a solid ink stick.
Figure 6:
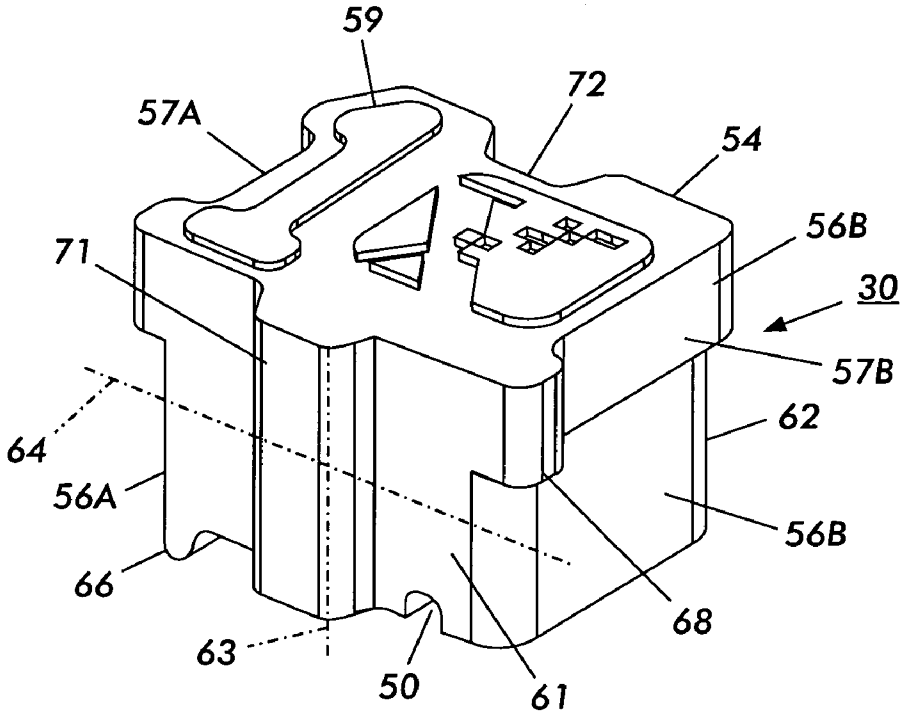
FIG. 6 is another perspective view of the ink stick of FIG. 5.

An exemplary solid ink stick 30 for use in the feed system is illustrated in FIGS. 5 and 6. The ink stick is formed of a three dimensional ink stick body. The ink stick body illustrated has a bottom surface 52 and a top surface 54 that are substantially parallel one another. The surfaces of the ink stick body need not be flat, nor need they be parallel or perpendicular one another. However, these descriptions will aid the reader in visualizing, even though the surfaces may have three dimensional topography, or be angled with respect to one another. The ink stick body also has a plurality of side extremities, such as side surfaces 56A, 56B, 61, 62. The illustrated embodiment includes four side surfaces, including two end surfaces 61, 62 and two lateral side surfaces 56A, 56B. The basic elements of the lateral side surfaces 56A are substantially parallel one another, and are substantially perpendicular to the top and bottom surfaces 52, 54. The end surfaces 61, 62 are also basically substantially parallel one another, and substantially perpendicular to the top and bottom surfaces, and to the lateral side surfaces. One of the end surfaces 61 is a leading end surface, and the other end surface 62 is a trailing end surface. The basic side surfaces 56A, 56B and the end surfaces 61, 62 are modified with key and other shaping elements, as described in greater detail below. The ink stick body may be formed by pour molding, injection molding, compression molding, or other known techniques.

The lateral side surfaces are illustrated with a stepped arrangement. The lower portions of the lateral side surfaces are closer to one another than are the upper portions of the lateral side surfaces, so that the lower portion of the ink stick body is narrower than the upper portion. However, the lateral side surfaces of the ink stick body can be substantially vertical, so that the ink stick body has a substantially uniform horizontal cross section. Alternatively, the lateral side surfaces could slant, giving the ink stick body a tapered shape from top to bottom.

The leading and trailing end surfaces have complementary non-planar shapes or contours. These contours may be defined by a plurality of straight lines connecting the top surface and the bottom surface along each of the end surfaces of the ink stick body, or by a plurality of curved lines connecting the top and bottom surfaces of the ink stick body. In the example shown, the non-planar contour of the first end surface 61 forms a projecting key or nesting element 71. The non-planar contour of the opposite end surface 62 forms a recessed key or nesting element 72. The complementary shapes 71, 72 nest with one another when two ink sticks are placed adjacent one another with the first end surface of one ink stick abutting the second end surface of an adjacent ink stick in the ink channel. This interaction of the contoured end surfaces of the adjacent ink sticks limits the movement of one ink stick with respect to the other. So limiting the relative movement of the ink sticks insures that the ink sticks do not become skewed with respect to each other or with respect to the feed channel as they travel along the length of the feed channel. The illustrated ink stick body includes a protruding nesting element on the leading end surface of the ink stick, and a complementary recessed nesting element on the trailing end surface of the ink stick body. The protruding nesting element may also be on the trailing end surface, with the complementary recessed nesting element on the leading end surface. In addition, the illustrated implementation has the complementary contours extending the entire height of the ink stick body from the top surface to the bottom surface. Alternative embodiments may have the projections and indentations extending only along a portion of the height of the ink stick body end surfaces 61, 62. The projecting and recessed elements 71, 72 on the end surfaces 61, 62 of the ink stick body can also be insertion key elements in cooperation with the appropriately shaped keyed openings 24A, 24B, 24C, 24D in the key plate 26.

Figure 7:
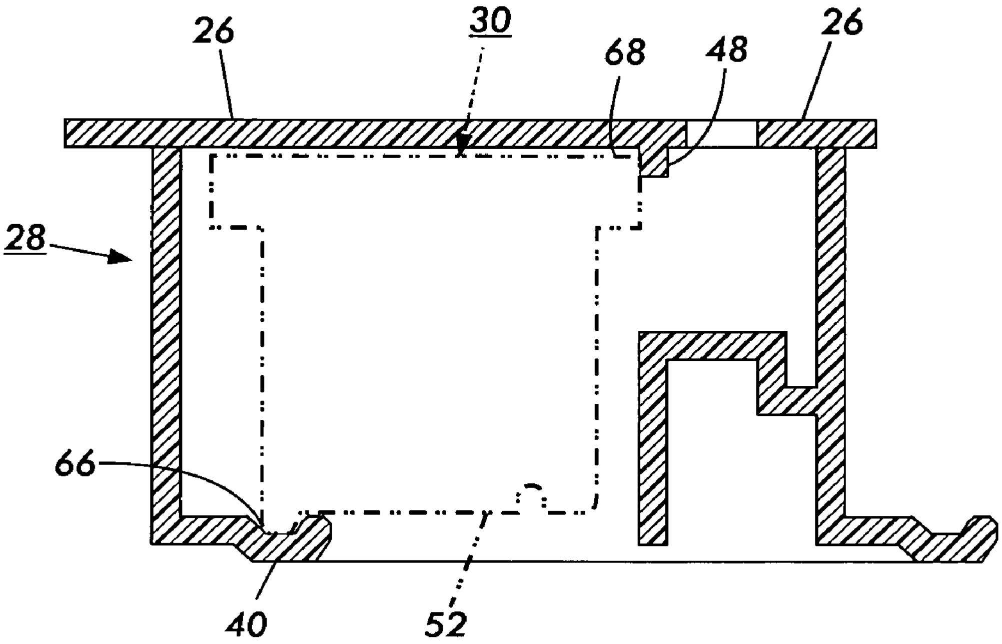
FIG. 7 is a simplified cross-sectional view of a feed channel taken along line 7—7 of FIG. 3.

The ink stick also includes guide means for guiding the ink stick along the feed channel 28 (see FIGS. 4 and 7). The ink stick body has a lateral center of gravity 63 between the two lateral side surfaces 56, and a vertical center of gravity 64 between the top surface 54 and the bottom surface 52 of the ink stick body. If the weight distribution of the ink stick body is substantially uniform, and the ink stick body is substantially symmetrical about its lateral center, the lateral center of gravity 63 is approximately at the midpoint between the lateral side surfaces of the ink stick body. The lateral center of gravity can often be determined without accounting for the insertion key elements formed in the lateral side surfaces of the ink stick body.

The ink stick guide means includes a lower guide element 66 formed in the ink stick body, below the vertical center of gravity. The lower guide element 66 interacts with a feed channel guide rail 40 in the feed channel for guiding the ink stick along the feed channel. For example, the lower guide element 66 shown is formed in the bottom surface 52 of the ink stick body as a protrusion from the bottom surface. The lower guide element is laterally offset from the lateral center of gravity 63 of the ink stick body, and may be adjacent one of the lateral sides of the ink stick body. In the illustrated example, the protruding guide element is formed at or near a lateral edge 58A of the bottom surface formed by the intersection of the bottom surface 52 and one of the lateral side surfaces 56A of the ink stick body. The protruding lower guide element can extend along the length of the ink stick body, from the first end surface 61 to the second end surface 62. The lower guide element 66 has a lateral dimension of approximately 0.12 inches (3.0 mm) and protrudes approximately 0.08–0.2 inches (2.0–5.0 mm) from the bottom surface of the ink stick body. The protruding lower guide element tapers from its proximal base, where it joins the main ink stick body, to its distal tip. The distal tip of the lower guide element may be somewhat rounded, or otherwise shaped to complement the guide rail in the lower portion of the ink feed channel. When the ink stick is inserted into a feed channel having an appropriate guide rail 40, the lower guide element 66 of the ink stick slidingly engages the guide rail 40 to guide the ink stick along the feed channel. The protruding lower guide element need not be continuous along the entire length of the ink stick body. In an alternative, the lower guide element can also be recessed into the bottom surface of the ink stick body. The guide rail 40 is raised to function with such a recessed lower guide element. The guide rail 40 and the lower guide element 66 are formed with compatible shapes, and may for example have complementary shapes.

The ink stick body additionally includes an upper guide element 68 that guides a portion of the ink stick body along an upper guide rail 48 in the feed channel and forms an additional portion of the ink stick guide means. The upper guide element 68 of the ink stick is formed above the vertical center of gravity 64 of the ink stick body, on the opposite side of the lateral center of gravity 63 from the lower guide element 66. The upper guide element may be a portion of the lateral extremity or side surface of the ink stick body. The lateral extremity side surface 56B containing the upper guide element 68 also intersects the bottom surface 52 of the ink stick body on the lateral edge of the bottom surface opposite the lateral edge nearest the lower guide element 66. The upper edge of the lateral side extremity or surface 56B forming the upper guide element 68 corresponds to the surface lateral edge 58B opposite the lateral edge 58A nearest the lower guide element 66.

Referring again to FIGS. 4 and 7, the upper guide rail 48 of the feed channel may be formed as part of the key plate 26, or may be a part of the feed channel body. The upper guide rail of the feed channel is positioned so that the upper guide element 68 of the ink stick body exerts a small lateral force on the upper guide rail. This lateral force tends to minimize the engagement force between the upper guide element 68 of the ink stick and the upper guide rail 48. The ink stick is guided using only two points or lines of contact—the lower guide element 66 on the lower guide rail 40, and the upper guide element 68 on the upper guide rail 48. This provides greater accuracy in guiding the ink stick along the feed channel, so that the ink stick retains its orientation in the feed channel as the ink stick progresses toward the melt plate 32.

The ink stick 30 illustrated in FIGS. 5 and 6 has the upper portion of the ink stick body, adjacent the top surface 54, formed to provide an outer perimeter that is formed with channel insertion key elements. The outer perimeter key elements are formed to provide the top surface with a visually recognizable shape or symbol. A visually recognizable symbol is a shape that conveys recognizable meaning to a user to help the user identify the opening 24A, 24B, 24C, 24D through which to insert the ink stick. The particular ink stick shown has the outer perimeter of the top surface 54 formed in the shape of the numeral "1." As seen, a left segment of the perimeter 57A of the ink stick forms the left portion of the symbol, while a right segment of the ink stick perimeter 57B forms the right portion of the visually recognizable symbol. A set of ink sticks for a particular printer could include additional ink sticks having top surface outer perimeters in the shapes of the numerals "2," "3," and "4" is shown in FIG. 8.

The shaped lateral side surfaces provide an ink channel insertion keying mechanism, as seen in FIG. 2. In such an implementation, the lateral edges of each keyed opening 24A, 24B, 24C, 24D through the key plate 26 are correspondingly shaped so that the keyed opening admits an ink stick body having the requisite lateral perimeter segment shapes, while excluding ink stick bodies having other lateral perimeter segment shapes. The printer operator can easily associate an ink stick having a particular feed channel of the printer, either by correlating the symbol of the ink stick with the corresponding keyed opening in the key plate, or by correlating the symbol of the ink stick with the corresponding symbol that can be displayed adjacent the keyed opening. Thus, the visually recognizable symbol formed by the lateral perimeter segments of the ink stick body provide an ink channel key that performs a color keying function for the printer by excluding from a particular channel of the printer ink sticks that are of the incorrect color.

Figure 8:
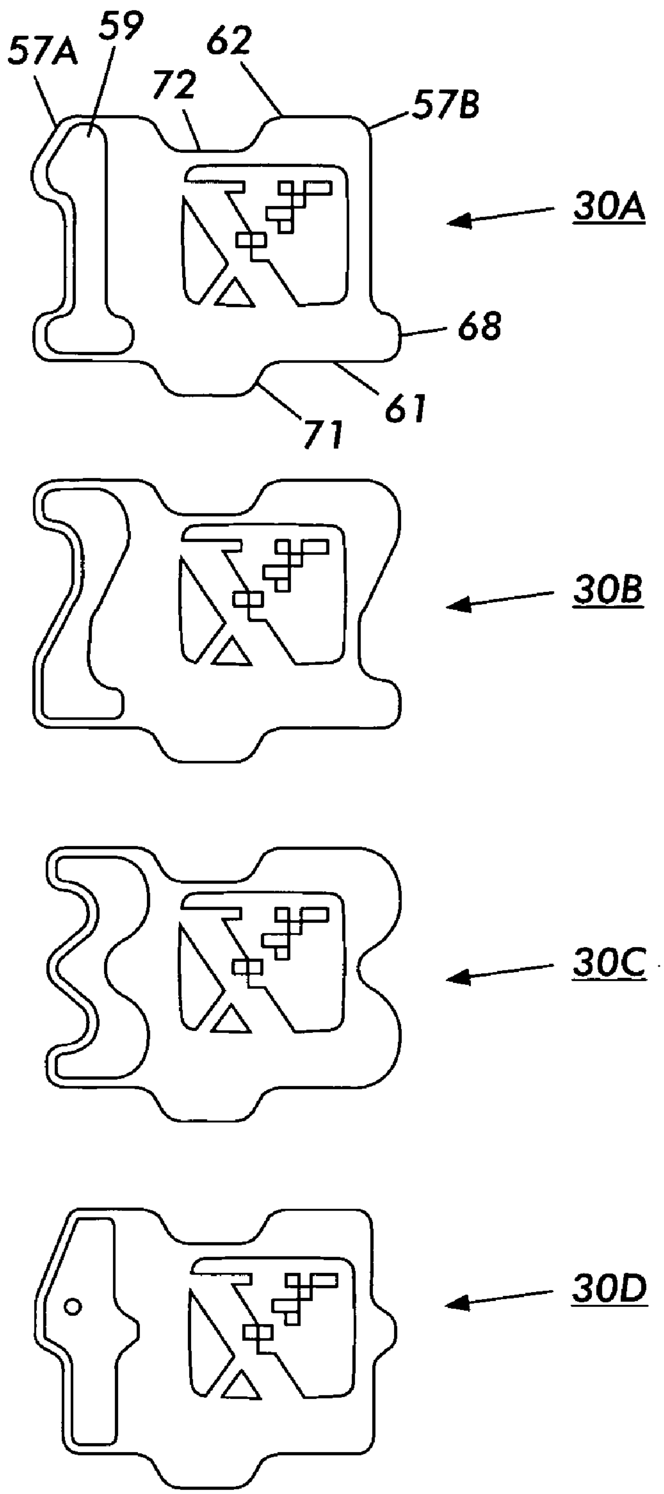
FIG. 8 is a top elevational view of a set of solid ink sticks.

In the ink stick set shown in FIG. 8, the visually recognizable shapes that identify the correct key plate opening, and thus the correct ink stick feed channel, are provided in both lateral side surfaces of the ink stick body. One side surface 56A of the ink stick body is shaped with one side edge of the visually recognizable symbol, and the other lateral side surface 56B of the ink stick body is shaped with the other side edge of the visually recognizable symbol.

The individual insertion channel keying function can be provided with shapes that provide visually recognizable symbols other than numeric characters. For example, a set of ink sticks could have perimeter segments that form visually recognizable alphabetical characters, such as the alphabetical characters are "C," "Y," "M," and "K," which printer operators will associate with the colors of the ink—C for cyan, Y for yellow, M for magenta, and K for black. Such alphabetical characters are easy for the printer operator to associate with the proper feed channel for each color of ink.

The ink stick perimeter can be formed into visually identifiable symbols other than alphanumeric characters, such as the suite shapes from common playing cards. With the present teaching, those skilled in the art will recognize that other symbols can also be used, such as the shapes of animals or other recognizable objects.

To enhance the visual recognition of the character, the substantially horizontal top surface 54 of the ink stick body can further be embossed or debossed with a representation of the visually recognizable symbol 59. In addition, other information such as a brand marking for the ink can be embossed or debossed on the top surface 54 of the ink stick body.

An additional perimeter segment of each ink stick is used to provide an additional insertion keying function. In the illustrated ink stick set, the additional insertion keying function is a printer keying function that associates a set of ink sticks with a particular printer model. The printer keying function is provided by providing a contour to at least a portion of the perimeter of the ink stick (when viewed from above). A common key element is included throughout a set of ink sticks intended for a particular printer that permits those ink sticks to be inserted into the feed channels of that printer, but prevent those ink sticks from being inserted into an incorrect printer. FIG. 8 shows a set of ink sticks 30A, 30B, 30C, 30D that has the additional keying function provided by key elements 71, 72 in one or more of the transverse side (end) segments 61, 62 of the outer perimeter of the ink stick body. In a substantially cubic ink stick body in which the outer perimeter coincides with the substantially vertical side surfaces of the ink stick body, the key element(s) 71, 72 are protrusions and indentations formed in the transverse end surface(s) that are substantially perpendicular to the lateral side surfaces. These transverse side surfaces may be the leading and trailing end surfaces of the ink stick body, and are at least partially transverse to the longitudinal direction of the feed channel when the ink stick is placed in the feed channel. This additional keying function can be used to protect particular ink printers from receiving ink sticks intended for a different printer model. Each ink stick of the set of ink sticks shown in FIG. 8 includes a key element of the same shape in the transverse side of the ink stick. Referring to the printer with its key plate shown in FIG. 2, a corresponding complementary key 73 is included in the perimeter of each keyed opening 24A, 24B, 24C, 24D for that particular printer model. The particular key 73 shown in the key plate of the printer of FIG. 2 corresponds to the key element 72 on the set of ink sticks shown in FIG. 8.

The first keying function, which in the illustrated example is performed by key elements on the lateral side segments 56A, 56B of the outer perimeter of the ink stick and corresponding lateral side edges of the keyed openings 24A, 24B, 24C, 24D, ensures that only ink sticks of the appropriate color are fed into each feed channel of the printer. The second keying function, which in the illustrated implementation is performed by key elements 71, 72 in the transverse sides 61, 62 of the ink sticks and the corresponding transverse edges of the keyed openings 24A, 24B, 24C, 24D, ensures that the ink sticks of all colors for a particular printer model can be inserted only into that printer. This prevents contamination of the printer that might occur if ink sticks having an ink formulation intended for one printer are inserted into the ink stick feed channels of a printer intended and designed to operate with a different type of ink stick, such as having a different ink formulation. Comparing FIGS. 8 and 2, the printer feed system shown in FIG. 2 is designed to admit the ink sticks of the ink stick set shown in FIG. 8. Thus, the first ink stick 30A of the set shown in FIG. 8 fits through the first keyed opening 24A of the feed system shown in FIG. 2, while the second ink stick 30B of the set shown in FIG. 8 fits through the second keyed opening 24B, and so forth.

Different printers sometimes require different types of ink. Therefore, this additional keying function provides a mechanism to block ink intended for one printer from being inserted into an incompatible printer. This printer exclusion keying function is provided by using different shapes for the common keys 73 in the keyed openings of the key plates 26 of different printers. The keys 73 along the traverse edges of each keyed opening of the feed system shown in FIG. 2 exclude ink sticks having different shapes of key elements in their transverse sides.

The above description will also make clear to those skilled in the art that feed channel insertion key elements can be included on multiple sides of the ink stick body. In addition to key elements on the lateral sides of the ink stick body, key elements can be included on sides that are at least in part transverse to the longitudinal feed direction of the feed channel (are not parallel to the lateral sides of the ink stick). These transverse sides are either straight or curved, and can be perpendicular to the lateral sides, or be at some other angle. Thus, additional perimeter segments are available to include key elements, so that a greater variety of key shapes can be used.

The envelope of the ink sticks illustrated in FIGS. 5–8, including contours, indentations, and protrusions for keying and alignment functions has an aspect ratio in which the width of the ink stick body between the lateral side surfaces 56A, 56B is approximately equal to or greater than the longitudinal length of the ink stick body between the end surfaces 61, 62. The longitudinal length of the ink stick body is the dimension that is along (aligned with) a longitudinal feed channel, such as the feed channel 28 of the ink jet printer 10 of FIG. 2, when the ink stick is properly inserted into the feed channel. The width of the ink stick body is the dimension perpendicular to the length. The ratio of the width of the ink stick body to the length is between 1.0 and 1.5. In the particular embodiment shown, the ratio of width to length is approximately 1.25. In one exemplary embodiment, the length of the ink stick body 30 between the end surfaces 61, 62 is approximately 1.2 inches (30 mm), and the width between the lateral side surfaces 56A, 56B is approximately 1.5 inches (38 mm). In addition, the height of the ink stick body between the bottom surface 52 and the top surface 54 can be significantly greater or less than either the length or the width.

This arrangement provides the printer operator improved flexibility in stocking ink in the feed channels. Each feed channel 28 has sufficient length to hold at least two ink sticks. As the leading ink stick adjacent the melt plate 32 (FIG. 3) in the particular ink stick feed channel melts, the push block 34 or gravity mechanism moves the following ink sticks along the length of the ink stick feed channel, toward the melt plate. In certain circumstances, such as prior to beginning a large print job, the operator may wish to replenish the quantity of solid ink sticks in the feed channel ("top off" the ink supply). The printer operator can insert a new ink stick through the keyed opening into the feed channel 28 only if the last ink stick currently in the feed channel is clear of the keyed opening. The operator has greater flexibility to insert additional ink sticks if the ink sticks have a shorter longitudinal length relative to their width. The ink stick aspect ratio described provides greater solid ink density per unit length of the feed channel, and provides an enhanced ability to fill the feed channel as closely to the keyed opening as possible.

In addition, an ink stick body with a substantially reduced dimension in at least one of the three orthogonal axes may allow more uniform formation of the ink stick body. For example, ink sticks may be formed by inserting molten ink into a mold, and allowing the ink to cool, solidifying as it cools. Such cooling can occur more uniformly when the ink stick body has at least one dimension in the three axes such that the interior mass is closer to an exterior surface, so that it cools more readily.

In addition, a feed keying element 50 is provided in one of the surfaces of the ink stick body. The ink stick feed keying element 50 permits the ink stick to pass a correspondingly shaped key 49 (FIGS. 3 and 4) in the feed channel as the ink stick 30 travels along the length of the feed channel. In the illustrated embodiment, the feed channel key 49 is a projection from the floor 46 or support rib of the feed channel, and the feed keying element in the ink stick body is a longitudinal recess formed in the bottom surface 52 of the ink stick body. However, the feed keying element may also be formed in one of the side surfaces 56A, 56B, or in the substantially horizontal top surface 54 of the ink stick body. Also, feed keys of different sizes, shapes, and positions can be used in different feed channels of a single printer to provide enhanced protection against an ink stick of the incorrect color reaching the melt plate 32. Feed keys can also be used to differentiate ink sticks intended for different models of printers. One type of feed key can be placed in all the feed channels of a particular model printer. Ink sticks intended for that model printer contain a corresponding feed key element. A feed key of a different size, shape, or position is placed in all feed channels of a different model printer. The different key blocks ink sticks having a feed key element for the first model printer, while permitting ink sticks having a feed key element corresponding to the second feed key to pass.

Those skilled in the art will recognize that corners and edges may have radii or other non-sharp configurations, depending on various factors, including manufacturing considerations. The above description of the ink stick demonstrates that the particular individual features described above and shown in the various implementations illustrated can be combined in a wide variety of combinations and arrangements to meet the particular needs of particular environments. The above descriptions of the various embodiments and the accompanying figures illustrate particular implementations of the ideas and concepts embodied. After studying the above descriptions and accompanying figures, those skilled in the art will recognize a number of modifications can be made. For example, a variety of shapes are possible for the various key elements, the visually recognizable shapes, and the core ink stick body itself. Therefore, the following claims are not to be limited to the specific implementations described and illustrated above.

We claim:

1. An ink stick for use in a solid ink feed system of a phase change ink printer, wherein the solid ink feed system includes an elongate ink stick feed channel with an elongate shaped guide rail extending in a feed direction, and a key plate covering at least a portion of the ink stick feed channel along the feed direction, wherein the key plate has an insertion opening providing access in an insertion direction into the feed channel, the ink stick comprising:

a three dimensional ink stick body having an insertion perimeter; and a non-planar shaped guide element formed in the ink stick body, wherein the guide element is shaped to interact with the elongate shaped guide rail of the solid ink feed system for guiding the ink stick along the guide rail;

wherein the ink stick insertion perimeter is in a plane substantially perpendicular to the insertion direction;

wherein the insertion direction is substantially different from the feed direction; and wherein the insertion perimeter has at least one perimeter section forming a nonlinear key element that matches in size and shape a nonlinear key element in the perimeter of the key plate insertion opening.

2. The ink stick of claim 1, wherein the insertion perimeter forms a visually recognizable symbol, and the at least one perimeter section forms a portion of the visually recognizable symbol.

3. An ink stick for use in a solid ink feed system of a phase change ink printer, wherein the solid ink feed system includes an elongate ink stick feed channel with an elongate shaped guide rail extending in a feed direction, and a key plate covering at least a portion of the ink stick feed channel along the feed direction, wherein the key plate has an insertion opening providing access in an insertion direction into the feed channel, the ink stick comprising:

a three dimensional ink stick body having an insertion perimeter; and a non-planar shaped guide element formed in the ink stick body, wherein the guide element is shaped to interact with the elongate shaped guide rail of the solid ink feed system for guiding the ink stick along the guide rail;

wherein the ink stick insertion perimeter is in a plane substantially perpendicular to the insertion direction;

wherein the insertion direction is substantially different from the feed direction;

wherein the insertion perimeter has at least one perimeter section forming a nonlinear key element that matches in size and shape a nonlinear key element in the perimeter of the key plate insertion opening; and wherein the insertion perimeter forms an alphanumeric character, and the at least one perimeter section forms a portion of the alphanumeric character.

4. The ink stick of claim 1, wherein the insertion direction is substantially perpendicular to the feed direction.

5. A set of ink sticks for use in a solid ink feed system of a phase change ink jet printer, wherein the phase change ink jet printer has a plurality of ink stick feed channels, each having an elongate shaped guide rail extending in a feed direction, and a plurality of ink stick openings, each for inserting ink sticks in an insertion direction into a corresponding one of the feed channels, the set of ink sticks comprising:

a first ink stick comprising a first three dimensional ink stick body;

wherein the first ink stick body has a first non-planar shaped guide element oriented in a first feed direction;

wherein the first non-planar shape guide element is shaped to interact with the elongate shaped guide rail of a corresponding first ink stick feed channel for guiding the ink stick in the first feed direction along the first guide rail;

wherein the first ink stick body has a first insertion perimeter forming the shape of a first visually identifiable symbol; and wherein the first insertion perimeter is oriented in a different direction than the first feed direction; and a second ink stick comprising a second three dimensional ink stick body;

wherein the second ink stick body has a second non-planar shaped guide element oriented in a second feed direction;

wherein the second non-planar shaped guide element is shaped to interact with the elongate guide rail of a corresponding second ink stick feed channel for guiding the ink stick in the second feed direction along the second guide rail;

wherein the second ink stick body has a second insertion perimeter forming the shape of a second visually identifiable symbol;

wherein the second insertion perimeter is oriented in a different direction than the second feed direction; and wherein the second visually identifiable symbol is different from the first visually identifiable symbol.

6. The set of ink sticks of claim 5, wherein the first and second visually identifiable symbols form a pattern of symbols.

7. The set of ink sticks of claim 5, wherein the first and second shaped guide elements of the first and second ink sticks are substantially identical in shape and size.

8. The set of ink sticks of claim 5, additionally comprising:

a third ink stick comprising a first three dimensional ink stick body;

wherein the third ink stick body has a third non-planar shaped guide element oriented in a third feed direction;

wherein the third non-planar shaped guide element is shaped to interact with the elongate shaped guide rail of a corresponding third ink stick feed channel for guiding the third ink stick in the third feed direction along the third guide rail;

wherein the third ink stick body has a third insertion perimeter forming the shape of a third visually identifiable symbol; and wherein the third insertion perimeter is oriented in a different direction than the third feed direction; and wherein the third visually identifiable symbol is different from both the first and second visually identifiable symbols.

9. The set of ink sticks of claim 8, additionally comprising:

a fourth ink stick comprising a fourth three dimensional ink stick body;

wherein the fourth ink stick body has a fourth non-planar shaped guide element oriented in a fourth feed direction;

wherein the fourth shaped guide element is shaped to interact with the elongate guide rail of a corresponding fourth ink stick feed channel for guiding the ink stick in the fourth feed direction along the fourth guide rail;

wherein the fourth ink slick body has a fourth insertion perimeter forming the shape of a fourth visually identifiable symbol;

wherein the fourth insertion perimeter is oriented in a different direction than the fourth feed direction; and wherein the fourth visually identifiable symbol is different from all of the first, second, and third visually identifiable symbols.

10. The set of ink sticks of claim 9, wherein the first, second, third and fourth visually identifiable symbols form a pattern of visually identifiable symbols.

11. A set of ink sticks for use in a solid ink feed system of a phase change ink jet printer, wherein the phase change ink jet printer has a plurality of ink stick feed channels, each having an elongate shaped guide rail extending in a feed direction, and a plurality of ink stick openings, each for inserting ink sticks in an insertion direction into a corresponding one of the feed channels, the set of ink sticks comprising:

a first ink stick comprising a first three dimensional ink stick body;

wherein the first ink stick body has a first non-planar shaped guide element oriented in a first feed direction;

wherein the first non-planar shape guide element is shaped to interact with the elongate shaped guide rail of a corresponding first ink stick feed channel for guiding the ink stick in the first feed direction along the first guide rail;

wherein the first ink stick body has a first insertion perimeter forming the shape of a first visually identifiable symbol; and wherein the first insertion perimeter is oriented in a different direction than the first feed direction; and a second ink stick comprising a second three dimensional ink stick body;

wherein the second ink stick body has a second non-planar shaped guide element oriented in a second feed direction;

wherein the second non-planar shaped guide element is shaped to interact with the elongate guide rail of a corresponding second ink stick feed channel for guiding the ink stick in the second feed direction along the second guide rail;

wherein the second ink stick body has a second insertion perimeter forming the shape of a second visually identifiable symbol;

wherein the second insertion perimeter is oriented in a different direction than the second feed direction;

wherein the second visually identifiable symbol is different from the first visually identifiable symbol;

wherein the first visually identifiable symbol is a first alphanumeric character; and wherein the second visually identifiable symbol is a second alphanumeric character.

12. The set of ink sticks of claim 11, wherein the first and second alphanumeric characters are a sequence of consecutive alphanumeric characters.

13. The set of ink sticks of claim 12, wherein:

the first horizontal perimeter has at least two first ink stick lateral perimeter segments;

the first ink stick lateral perimeter segments are on opposite sides of the first ink stick body;

the first ink stick lateral perimeter segments form the shape of a first alphanumeric character;

the second horizontal perimeter has at least two second ink stick lateral perimeter segments; and the second ink stick lateral perimeter segments are on opposite sides of a second ink stick body; and the second ink stick lateral perimeter segments form the shape of the second alphanumeric character.

14. The set of ink sticks of claim 13, additionally comprising:

a third ink stick comprising a third three dimensional ink stick body having:

a third horizontal perimeter;

wherein the third horizontal perimeter has at least two third ink stick lateral perimeter segments on opposite sides of the third ink stick body; and wherein the third ink stick lateral perimeter segments form the shape of a third alphanumeric character; and a fourth ink stick comprising a fourth three dimensional ink stick body having:

a fourth horizontal perimeter;

wherein the fourth horizontal perimeter has at least two fourth ink stick lateral perimeter segments on opposite sides of the fourth ink stick body;

wherein the fourth ink stick lateral perimeter segments form the shape of a fourth alphanumeric character; and wherein the first, second, third, and fourth alphanumeric character are each different from one another.

15. The set of ink sticks of claim 14, wherein the first, second, third, and fourth alphanumeric characters form a pattern of alphanumeric characters.

16. The set of ink sticks of claim 14, wherein the first, second, third, and fourth alphanumeric characters form a sequence of consecutive alphanumeric characters.

17. The set of ink sticks of claim 11, wherein the first and second alphanumeric characters are a sequence of consecutive numbers.

18. A method of inserting an ink stick into an ink feed system, the method comprising:

identifying an ink stick perimeter shape;

matching the ink stick perimeter shape with a correspondingly shaped key plate opening of the ink feed system;

inserting the ink stick in an insertion direction through the key plate opening;

engaging a shaped ink stick guide element on the ink stick with a shaped guide rail in the ink feed system having a shape corresponding to the shape of the shaped ink stick guide element; and moving the ink stick in a feed direction so that the shaped ink stick guide element engaged with the shaped guide rail guides the shaped ink stick guide element along the shaped guide rail;

wherein the feed direction is different from the insertion direction.

19. The method of claim 18, wherein the insertion direction is substantially perpendicular to the feed direction.

20. The method of claim 18, wherein inserting the ink stick through the key plate opening comprises inserting the portion of the ink stick having the shaped ink stick guide element through the key plate opening before inserting other portions of the ink stick.

21. A set of ink sticks for use in a solid ink feed system of a phase change ink jet printer, wherein the phase change ink jet printer has a plurality of ink stick feed channels, each having an elongate shaped guide rail extending in a feed direction, and a plurality of ink stick openings, each for inserting ink sticks in an insertion direction into a corresponding one of the feed channels, the set of ink sticks comprising:

a first ink slick comprising a first three dimensional ink stick body;

wherein the first ink stick body has a first non-planar shaped guide element oriented in a first feed direction;

wherein the first non-planar shaped guide element is shaped to interact with the elongate shaped guide rail of a corresponding first ink stick feed channel for guiding the ink stick in the first feed direction along the first guide rail;

wherein the first ink stick body has a first insertion perimeter forming the shape of a first visually identifiable symbol; and wherein the first insertion perimeter is oriented in a different direction than the first feed direction;

a second ink stick comprising a second three dimensional ink stick body;

wherein the second ink stick body has a second non-planar shaped guide element oriented in a second feed direction;

wherein the second non-planar shaped guide element is shaped to interact with the elongate guide rail of a corresponding second ink stick feed channel for guiding the ink stick in the second feed direction along the second guide rail;

wherein the second ink stick body has a second insertion perimeter forming the shape of a second visually identifiable symbol;

wherein the second insertion perimeter is oriented in a different direction than the second feed direction;

a third ink stick comprising a first three dimensional ink stick body;

wherein the third ink stick body has a third non-planar shaped guide element oriented in a third feed direction;

wherein the third non-planar shaped guide element is shaped to interact with the elongate shaped guide rail of a corresponding third ink stick feed channel for guiding the third ink stick in the third feed direction along the third guide rail;

wherein the third ink stick body has a third insertion perimeter forming the shape of a third visually identifiable symbol; and wherein the third insertion perimeter is oriented in a different direction than the third feed direction; and a fourth ink stick comprising a fourth three dimensional ink stick body;

wherein the fourth ink stick body has a fourth non-planar shaped guide element oriented in a fourth feed direction;

wherein the fourth shaped guide element is shaped to interact with the elongate guide rail of a corresponding fourth ink stick feed channel for guiding the ink stick in the fourth feed direction along the fourth guide rail;

wherein the fourth ink stick body has a fourth insertion perimeter forming the shape of a fourth visually identifiable symbol;

wherein the fourth insertion perimeter is oriented in a different direction than the fourth feed direction; and wherein the first, second, third and fourth visually identifiable symbols are a sequence of four consecutive alphanumeric characters.

22. The set of ink sticks of claim 21, wherein the first, second, third and fourth visually identifiable symbols are a sequence of four consecutive numbers.

* * * * *